(12) United States Patent
Ohtomo et al.

(10) Patent No.: US 7,005,497 B2
(45) Date of Patent: Feb. 28, 2006

(54) LIQUID-CRYSTALLINE POLYESTER PRODUCTION METHOD

(75) Inventors: Shinji Ohtomo, Tsukuba (JP); Satoshi Okamoto, Tsukuba (JP); Akiko Nakazono, Tsukuba (JP); Hideyuki Ikehira, Mukou (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/939,477

(22) Filed: Sep. 14, 2004

(65) Prior Publication Data

US 2005/0080227 A1   Apr. 14, 2005

(30) Foreign Application Priority Data

Sep. 16, 2003   (JP) .............................. 2003-322819

(51) Int. Cl.
*C08G 63/00*   (2006.01)
(52) U.S. Cl. ...................... 528/308; 528/176; 528/193; 528/271; 528/272
(58) Field of Classification Search ................ 528/176, 528/193, 271, 272, 308
See application file for complete search history.

(56) References Cited

U.S. PATENT DOCUMENTS

2002/0055607 A1   5/2002   Okamoto et al.

FOREIGN PATENT DOCUMENTS

| EP | 0 373 592 A2 | 6/1990 |
| JP | 06-001836 A | 1/1994 |
| JP | 2002-146003 A | 5/2002 |

OTHER PUBLICATIONS

Wolfgang Stadbauer, et al. "Palladium-katalysierte Ringschlubreaktionen zu Benzofuranen: ein neuer and effektiver Zugang zu Azacumostroldervaten", Liebigs Ann. Chem. 1990, pp. 531-539.

Scott C. Berk, et al. "Preparation and Reactions of Functionalized Benzylic Organometallics of Zinc and Copper", Organometallics, 1990, 9, pp. 3053-3064, American Chemical Society.

Cheuk K. Lau, et al. "Synthesis and Structure-Activity Relationships of a Novel Class of 5-Lipoxygenase Inhibitors, 2-(Phenylmethyl)-4-hydroxy-3,5-dialkylbenzofurans: The Development of L-656,224", J. Med. Chem., 1989, 32 pp. 1190-1197, American Chemical Society.

*Primary Examiner*—Terressa Boykin
(74) *Attorney, Agent, or Firm*—Sughrue Mion, PLLC

(57) ABSTRACT

A liquid-crystalline polyester production method with a shortened reaction time and improved productivity per unit time by using an organic basic compound containing one nitrogen atom in a molecule is achieved by a liquid-crystalline polyester production method comprising carrying out acylation reaction and/or ester-exchange in the presence of an organic basic compound containing one nitrogen atom in one molecule and satisfying the following inequality (1):

$$0 < A + 0.4 \times B \quad (1)$$

wherein, A and B satisfy $A = \{(Ec^{h+} - Ec)/(Ep^{h+} - Ep)\} - 1$ and $B = (\phi f/\phi fp) - 1$;

Ec denotes the heat of formation of the organic basic compound; $Ec^{h+}$ denotes the heat of formation of a compound coordinated by proton; Ep denotes the heat of formation of pyridine; and $Ep^{h+}$ denotes the heat of formation of pyridine coordinated by proton to the nitrogen atom; $\phi f$ and $\phi fp$ independently denote parameters relevant to the steric angles.

4 Claims, No Drawings

LIQUID-CRYSTALLINE POLYESTER PRODUCTION METHOD

FIELD OF THE INVENTION

The invention relates to a liquid-crystailine polyester production method.

BACKGROUND OF THE INVENTION

A liquid-crystalline polyester has been used as a material for electric and electronic parts, and as its general production method, it has been known that a method involving acylation step of a phenolic hydroxy group of an aromatic hydroxycarboxylic acid such as p-hydroxybenzoic acid and/or an aromatic diol such as 4,4'-dihydroxybiphenyl by reacting with an fatty acid anhydride to obtain an acylated aromatic hydroxycarboxylic acid and/or an acylated aromatic diol, and ester-exchange step of the acylated aromatic hydroxycarboxylic acid and/or the acylated aromatic diol with aromatic dicarboxylic acid such as terephthalic acid. It is also well known that pyridine is used in the the acylation reaction (JP No. 6-1836 A).

In the case of using an organic basic compound containing one nitrogen atom in a molecule such as pyridine, the reaction time of acylation reaction can be reduced more than the case of using no pyridine, but the reaction time is not reduced sufficiently yet and it is desired to further improve the productivity of a liquid-crystalline polyester per unit time. The object of the invention is to provide a liquid-crystalline polyester production method with a shortened reaction time and improved productivity per unit time by using an organic basic compound containing one nitrogen atom in a molecule.

SUMMARY OF THE INVENTION

Based of the results of intensive investigations on a liquid-crystalline polyester production method, inventors have found that the reaction time can be reduced and the productivity of a liquid-crystalline polyester per unit can be improved by carrying out acylation reaction and/or ester-exchange reaction in the presence of a specified organic basic compound containing one nitrogen atom in a molecule and accordingly have accomplished the invention.

That is, the invention provides

[1] a liquid-crystalline polyester production method comprising one of the following steps (A) to (C):

(A) acylation reaction of the phenolic hydroxyl group of an aromatic hydroxycarboxylic acid by using a fatty acid anhydride to obtain acylated aromatic hydroxycarboxylic acid, and successively ester-exchange reaction by reacting the acylated aromatic hydroxycarboxylic acid with each other;

(B) acylation reaction of the phenolic hydroxyl group of an aromatic diol by using a fatty acid anhydride to obtained acylated aromatic diol, and successively ester-exchange reaction by reacting the acylated aromatic diol with an aromatic dicarboxylic acid; and (C) acylation reaction of the phenolic hydroxyl group of an aromatic diol and an aromatic hydroxycarboxylic acid by using a fatty acid anhydride to obtain acylated aromatic diol and acylated aromatic hydroxycarboxylic acid, and successively ester-exchange reaction by reacting the acylated aromatic diol and acylated aromatic hydroxycarboxylic acid with an aromatic dicarboxylic acid; wherein the acylation reaction and/or ester-exchange reaction is carried out in the presence of an organic basic compound containing one nitrogen atom in one molecule and satisfying the following inequality (1):

$$0 < A + 0.4 \times B \quad (1)$$

[wherein, A and B satisfy $A = \{(Ec^{h+} - Ec)/(Ep^{h+} - Ep)\} - 1$ and $B = (\phi f/\phi fp) - 1$;

Ec denotes the heat of formation of the organic basic compound containing one nitrogen atom in a molecule; $Ec^{h+}$ denotes the heat of formation of a compound which is of the organic basic compound coordinated by proton ($H^+$) to the nitrogen atom; Ep denotes the heat of formation of pyridine; and $Ep^{h+}$ denotes the heat of formation of a compound which is a pyridine coordinated by proton ($H^+$) to the nitrogen atom; $\phi f$ denotes the value calculated by dividing the entire surface area by $(L+a)^2$, wherein the entire surface area is the portion shed over by light from a point light source without being obstructed by atoms in the molecule other than the nitrogen atom, in the spherical inner part with a radius (L+a) from the origin, which is the center of nitrogen atom of the organic basic compound containing one nitrogen atom in a molecule in the most stable steric coordination, assuming that the point light source is positioned at the origin,; L denotes the distance from the origin to the center of the atom remotest in the molecule; and "a" denotes the van der Waals radius of the atom in the molecule; and $\phi fp$ denotes the value of $\phi f$ in the case the organic basic compound containing one nitrogen atom in a molecule is pyridine:

[2] the liquid-crystalline polyester production method according to the above [1], wherein the organic basic compound is at least one compound selected from the group consisting of a heterocyclic compound containing one nitrogen atom in a molecule and a heterocyclic compound containing one oxygen atom in addition to one nitrogen atom in a molecule:

[3] the liquid-crystalline polyester production method according to the above [2], wherein the heterocyclic compound represented by the following formula (2):

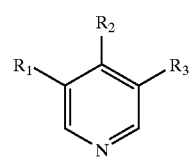

(2)

(wherein, R1 to R3 independently denote a hydrogen atom, an alkyl group having 1 to 20 carbon atoms, an alkyloxy group having 1 to 20 carbon atoms, an aryl group having 6 to 20 carbon atoms, a cycloalkyl group having 5 to 20 carbon atoms, or an aralkyl group having 7 to 20 carbon atoms; $R_1$ with $R_2$ and/or $R_2$ with $R_3$ may be bonded with each other to form an aliphatic ring or aromatic ring; and all of $R_1$ $R_2$, and $R_3$ may not be hydrogen atoms: and

[4] the liquid-crystalline polyester production method according to the above [1], wherein the aromatic hydroxycarboxylic acid is at least one compound selected from a group consisting of 4-hydroxybenzoic acid and 2-hydroxy-6-naphthoic acid, the aromatic dicarboxylic acid is at least one compound selected from a group consisting of terephthalic acid and isophthalic acid, and the aromatic diol is 4,4'-dihydroxybiphenyl.

According to the invention, a reaction time and improved productivity per unit time is achieved by using a specified organic basic compound containing one nitrogen atom in a molecule during producing liquid-crystalline polyester.

DETAILED DESCRIPTION OF THE PREFERRED EMBODIMENT

In the invention, during a specified organic basic compound containing one nitrogen atom in a molecule and satisfying the following inequality (1) is used producing a liquid-crystalline polyester:

$$0 < A + 0.4 \times B \quad (1)$$

[wherein, A and B are defined as $$A = \{(Ec^{h+} - Ec)/(Ep^{h+} - Ep)\} - 1 \text{ and}$$

$$B = (\phi f/\phi fp) - 1.$$

In the foregoing equations, Ec denotes the heat of formation of the organic basic compound containing one nitrogen atom in a molecule: $Ec^{h+}$ denotes the heat of formation of a compound which is the organic basic compound coordinated by proton to the nitrogen bond: Ep denotes the heat of formation of pyridine: and $Ep^{h+}$ denotes the heat of formation pyridine coordinated by proton (H$^+$) to the nitrogen atom.

The $\phi f$ denotes the value calculated by dividing the entire surface area (Sa) by (L+a)$^2$, wherein the entire surface area is the portion shed over by light from a point light source without being obstructed by atoms in the molecule other than the nitrogen atom, in the spherical inner part with a radius (L+a) from the origin, which is the center of nitrogen atom of the organic basic compound containing one nitrogen atom in a molecule in the most stable steric coordination, assuming that the point light source is positioned at the origin,; L denotes the distance from the origin to the center of the atom remotest in the molecule; and the reference character a denotes the van der Waals radius of the atom in the molecule.

Incidentally, the expression "light of the point light source" is an imaginary one and the wavelength of the light is assumed to be sufficiently short as compared with the size of an atom such as a nitrogen atom and it is assumed to be short enough not to take interference or diffraction of lights into consideration. Further, it is assumed that the light is obstructed by the circular regions of van der Waals radius from the center of the each atom in the molecule other than nitrogen atom (except that the overlapping region of the circular region of van der Waals radius of nitrogen atom and the circular region of van der Waals radius of an atom is not obstructed from the light.).

To calculate $\phi f$, all of a steric angle corresponding to an infinitesimal region where there is no atom other than a nitrogen atom in space region from the origin to the infinitesimal region, on the spherical inner surface of a radius (L+a), is added to obtain total of the steric angle, and $\phi f$ is the total of the steric angle.

In this case, the steric angles mean the surface areas of portions of the spherical inner surface shed over by light when a virtual light source is placed at the center of the sphere with the unit radius. For example, since the surface area of a spherical inner surface having the unit radius is $4\pi$, the steric angle is $4\pi$ in the case where the virtual light source shed light over the entire spherical inner surface.

"The case there is no atom other than a nitrogen atom" means the case that there is no circular region having van der Waals radius of the atom in the space region.

Incidentally, the overlapping region of the circular region of van der Waals radius of a nitrogen atom with the circular region of van der Waals radius of the atom is regarded as the overlapping region excluded from the circular region of van der Waals radius of the atom.

The $\phi fp$ denotes the value $\phi f$ in the case the organic basic compound containing one nitrogen atom in a molecule is pyridine.

Additionally, the most stable steric coordination of the organic basic compound containing one nitrogen atom in a molecule for calculating the heat of formation and the total $\phi f$ of the steric angle can be optimized by the AM1 method (Dewar, M. J. S. et al, J. Am. Chem. Soc., 107, 3902 (1985)), which is a semi-empirical molecular orbital method.

An organic basic compound containing one nitrogen atom in a molecule satisfying the above-mentioned inequality (1) include, for example, a heterocyclic compound containing one nitrogen atom in a molecule. The heterocyclic compound may contain an oxygen atom in addition to the nitrogen atom.

Examples of such a heterocyclic compound include those defined by the formula (2):

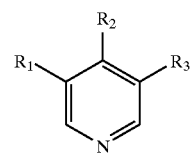

(2)

(wherein, R$_1$ to R$_3$ independently denote a hydrogen atom, an alkyl group having 1 to 20 carbon atoms, an alkyloxy group having 1 to 20 carbon atoms, an aryl group having 6 to 20 carbon atoms, a cycloalkyl group having 5 to 20 carbon atoms, or an aralkyl group having 7 to 20 carbon atoms; R$_1$ and R$_2$, and/or R$_2$ and R$_3$ may be bonded to form an aliphatic ring or aromatic ring; and all of R$_1$, R$_2$ and R$_3$ may not be hydrogen atoms).

Examples of the alkyl having 1 to 20 carbon atoms are straight chain or branched hydrocarbon groups such as methyl, ethyl, n-propyl, iso-propyl, n-butyl, iso-butyl, tert-butyl, n-pentyl, iso-pentyl, tert-pentyl, n-hexyl, iso-hexyl, and tert-hexyl groups. Examples of the alkyloxy group having 1 to 20 carbon atoms are methoxy, ethoxy, propoxy, butoxy, isopropoxy, isobutoxy, and tert-butoxy groups. Examples of the aryl group having 6 to 20 carbon atoms are phenyl, naphthyl, and biphenyl groups. Examples of the cycloalkyl group having 5 to 20 carbon atoms are cyclopentyl and cyclohexyl groups. Examples of the aralkyl group having 7 to 20 carbon atoms are phenylmethyl, phenylethyl, phenylpropyl, and diphenylmethyl groups.

The preferable alkyl group is that having 1 to 10 carbon atoms: the preferable alkyloxy group is that having 1 to 10 carbon atoms: the preferable aryl group is that having 6 to 12 carbon atoms: the preferable cycloalkyl group is that having 5 to 10 carbon atoms: and the preferable aralkyl group is that having 7 to 10 carbon atoms.

R$_1$ and R$_2$, and/or R$_2$ and R$_3$ may be bonded to form an aliphatic ring or aromatic ring. An organic basic compound having such an aliphatic ring include, for example, 5,6,7,8-tetrahydroisoquinoline. An organic basic compound having an aromatic ring include, for example, isoquinoline.

The organic basic compound defined by the formula (2) include quinoline compounds and pyridine compounds. An example of the quinoline compounds include isoquinoline.

Examples of the pyridine compounds are alkylpyridines such as β-picoline, γ-picoline, 3-ethylpyridine, 4-ethylpyridine, 4-propylpyridine, 4-butylpyridine, 4-isobutylpyridine, 3,4-lutidine, 3,5-lutidine, 3-methyl-4-ethylpyridine, 3-ethyl-4-methylpyridine, 3,4-diethylpyridine, 3,5-diethylpyridine, and 4-(5-nonyl)pyridine; and alkyloxypyridines such as 3-methoxypyridine and 4-methoxypyridine. As the organic basic compound, two or more of these compounds may be used in combination. As the organic basic compound, isoquinoline, β-picoline, γ-picoline, 3-ethylpyridine, 4-ethylpyridine, 3-methoxypyridine, and 4-methoxypyridine are preferable and isoquinoline, β-picoline, and γ-picoline are more preferable.

Raw materials for the liquid-crystalline polyester to be used for the production method of the invention will be described below.

The aromatic diol to be used in the invention may include, for example, unsubstituted aromatic diols such as hydroquinone, resorcinol, 4,4'-dihydroxydiphenyl, 4,4''-dihydroxytriphenyl, 4,4'-dihydroxydiphenyl ether, bis(4-hydroxyphenyoxy)ethane, 3,3'-dihydroxydiphenyl, 3,3'-dihydroxydiphenyl ether, 1,4-naphthalenediol, 1,5-naphthalenediol, 2,6-naphthalenediol, 2,2-bis(4-hydroxyphenyl)propane, and 2,2-bis(4-hdyroxyphenyl)methane; and substituted aromatic diols such as methylhydroquinone, butylhydroquinone, phenylhydroquinone, methoxyhydroquinone, phenoxyhydroquinone, 4-chlororesorcinol, and 4-methylresorcinol. Two or more of the aromatic diols may be used in combination. Among them, from the viewpoint of the availability and the price, hydroquinone, resorcinol, and 4,4'-dihydroxybiphenyl are preferable and from the viewpoint of the heat resistance of the obtained polymer, 4,4'-dihydroxybiphenyl is more preferable.

Examples of the aromatic hydroxycarboxylic acid to be used in the invention are hydroxybenzoic acids such as 4-hydroxybenzoic acid and 3-hydroxybenzoic acid; alkyl-substituted hydroxybenzoic acids such as 3-methyl-4-hydroxybenzoic acid, 3,5-dimethyl-4-hydroxybenzoic acid and 2,6-dimethyl-4-hydroxybenzoic acid; alkoxy-substituted hydroxybenzoic acids such as 3-methoxy-4-hydroxybenzoic acid and 3,5-dimethoxy-4-hydroxybenzoic acid; hydroxynaphthoic acids such as 6-hydroxy-2-naphthoic acid, 7-hydroxy-2-naphthoic acid, and 6-hydroxy-1-naphthoic acid; alkyl-substituted hydroxynaphthoic acids such as 6-hydroxy-5-methyl-2-naphthoic acid; alkoxy-substituted hydroxynaphthoic acids such as6-hydroxy-5-methoxy-2-naphthoic acid; and 4-hydroxy-4'-biphenylcarboxylic acid. As the aromatic hydroxycarboxylic acid, two or more of these compounds may be used in combination. From the viewpoint of liquid crystallinity of the obtained polymer, 4-hydroxybenzoic acid, 6-hydroxy-2-naphthoic acid, and 4-hydroxy-4'-biphenylcarboxylic acid are preferable and from the view point of the availability and the price, 4-hydroxybenzoic acid and 6-hydroxy-2-naphthoic acid are more preferable.

Examples of the aromatic dicarboxylic acid to be used in the invention are terephthalic acid, 4,4'-diphenyldicarboxylic acid, 4,4''-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenoxyethane-3,3'-dicarboxylic acid, and diphenylethane-3,3'-dicarboxylic acid. Two or more of these aromatic dicarboxylic acids may be used in combination. Among them, from the viewpoint of reactivity, terephthalic acid, isophthalic acid, and 2,6-naphthalenedicarboxylic acid are preferable and one or more compounds selected from the group consisting of terephthalic acid and isophthalic acid are more preferable.

Examples of the fatty acid anhydride to be used in the invention are acetic anhydride, propionic anhydride, butyric anhydride, isobutyric anhydride, valeric anhydride, pivalic anhydride, 2-ethylhexanoic anhydride, monochloroacetic anhydride, dichloroaceticanhydride, trichloroaceticanhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, and β-bromopropionic anhydride, however the fatty acid anhydride is not limited to these examples. Two or more of the fatty acid anhydrides may be used in combination. From the viewpoint of the price and the handling easiness, acetic anhydride, propionic anhydride, butyric anhydride, and isobutyric anhydride are preferably used and acetic anhydride is more preferably used.

The acylation reaction in the invention will be described below.

The acylation reaction in the invention is carried out by one of the following steps (A-1) to (C-1):

(A-1) carrying out acylation reaction of the phenolic hydroxyl group of an aromatic hydroxycarboxylic acid by using a fatty acid anhydride for obtaining acylated aromatic hydroxycarboxylic acid;

(B-1) carrying out acylation reaction of the phenolic hydroxyl group of an aromatic diol by using a fatty acid anhydride for obtaining acylated aromatic diol; and (C-1) carrying out acylation reaction of the phenolic hydroxyl group of an aromatic diol and the phenolic group of an aromatic hydroxycarboxylic acid by using a fatty acid anhydride for obtaining acylated aromatic diol and acylated aromatic hydroxycarboxylic acid.

The use amount of the fatty acid anhydride to the phenolic hydroxyl group of the aromatic diol and/or the aromatic hydroxycarboxylic acid in the acylation reaction of one of (A-1) to (C-1) is preferably in a range of 1.0 to 1.2 times by equivalent. From the viewpoint of suppressed out gas from a molded product of the obtained polymer and resistance from solder blister of a formed product, it is more preferably in a range of 1.0 to 1.1 times by equivalent and even more preferably in a range of 1.05 to 1.1 times by equivalent. If the use amount of the fatty acid anhydride to the phenolic hydroxyl group is less than 1.0 time by equivalent, the unreacted aromatic diol or aromatic dicarboxylic acid is sublimated at the time of polymerization and therefore, lines or pipes a reactor may be clogged. On the other hand, if exceeds 1.2 times by equivalent, coloration of the liquid-crystalline polyester to be obtained tends to be significant.

The use amount of the organic basic compound in the acylation reaction is preferably 0.005 to 1 part by weight to the total weight of one of the following (a) to (c) to be used as raw materials:

(a) the aromatic hydroxycarboxylic acid;

(b) the aromatic dicarboxylic acid and the aromatic diol; or (c) the aromatic hydroxycarboxylic acid, the aromatic dicarboxylic acid, and the aromatic diol: and from the viewpoint of the color tone of the obtained polymer and improving productivity it is more preferably 0.02 to 0.1 parts by weight. If the use amount is less than 0.005 parts by weight, the promoting effect for acylation reaction of the organic basic compound may not be sufficient and if it exceeds 1 part by weight, the reaction may be difficult to control. The organic basic compound may be added at the anytime during the reaction, however, from the viewpoint of the productivity, it is preferable to add the compound to the reaction system immediately after loading of the raw materials such as the aromatic dicarboxylic acid, the aromatic diol, the aromatic hydroxycarboxylic acid, and the fatty acid anhydride.

With respect to the acylation reaction, if the acylation reaction time is too long, the productivity may be low and the resin may be colored and therefore, it is preferable to carry out reaction at about 130° C. to about 180° C. for about 0.1 to about 3 hours, more preferably about 140 to about 160° C. at about 0.2 to about 1 hour.

The production method of the invention involves one of the following ester-exchange reactions (A-2) to (C-2) following one of the above-mentioned acylation reaction (A-1) to (C-1):

(A-2) carrying out ester-exchange reaction by reacting the acylated aromatic hydroxycarboxylic acids with each other;

(B-2) carrying out ester-exchange reaction by reacting the acylated aromatic diol with an aromatic dicarboxylic acid; and (C-2) carrying out ester-exchange reaction by reacting the acylated aromatic diol and the acylated aromatic hydroxycarboxylic acid with an aromatic dicarboxylic acid.

In the invention, the liquid-crystalline polyester is polymerized by the above-mentioned step of ester-exchange reaction. In the ester-exchange reaction, in the case of using the organic basic compound, the use amount of it is same as the above-mentioned weight ratio relation to the total of the raw materials in the acylation reaction.

The ester-exchange reaction is carried out preferably at a temperature-increasing rate in a range of 0.1 to 50° C./min in a range of about 130 to about 400° C., more preferably at a temperature-increasing rate in a range of 0.3 to 5° C./min in a range of about 150 to about 350° C.

In the ester-exchange reaction, in order to shift the equilibrium of the reaction toward the liquid-crystalline polyester production, it is preferable to remove the fatty acid produced as a byproduct or unreacted fatty acid anhydride by evaporation to the outside of the system. Further, the raw materials adhering to walls of reaction vessel can be turned back to a reaction liquid by returning a portion of the removed fatty acid back to the reaction liquid.

The polymerization method by the ester-exchange reaction includes, a melt polymerization method, a solution polymerization method, and a slurry polymerization method. The liquid-crystalline polyester produced by these polymerization methods may be subjected to further a solid-phase polymerization by heating the liquid-crystalline polyester in a reduced pressure or an inert gas to increase the molecular weight.

A solvent in the case of the solution polymerization or the slurry polymerization may be used, and the solvent includes, liquid paraffins, high heat resistance synthetic oils, and inert mineral oils.

The acylation reaction and ester-exchange reaction (condensation polymerization reaction) can be carried out by using a batch type apparatus and a continuous type apparatus.

The monomers of all of the raw materials, the fatty acid anhydride, and the organic basic compound are introduced into a single reaction vessel and then the reaction may be started or after completion of the acylation reaction in advance, the ester-exchange reaction may be carried out.

EXAMPLES

Hereinafter, the invention will be described more in details along with Examples, however the invention should not be limited to these examples.

The acylation reaction ratio in the following examples was defined by the content of p-acetoxybenzoic acid as acylated aromatic hydroxycarboxylic acid [mol %]/(the content of p-acetoxybenzoic acid [mol%]+the content of p-hydroxybenzoic acid as aromatic hydroxycarboxylic acid [mol %]) in the reaction mass. The content was analyzed by liquid chromatography and was calculated by using previously determined calibration curves of the contents of p-acetoxybenzoic acid and p-hydroxybenzoic acid, which are obtained from converting the its peak surface areas into the content by using an inner standard substance (4,4'-oxybis(benzoic acid)).

Liquid Chromatography (LC) Analysis

The LC analysis conditions were as follows.

Sample solution: a sample 30 mg was taken and dissolved in N-methylpyrrolidone 10 ml;

Apparatus: Waters 600E (manufactured by Waters);

Detector: Waters 484 (manufactured by Waters);

Column: ODS-AM AM-312 (5 $\mu$m, 6 mm$\phi$×15 cm);

Column temperature: 40° C.;

Mobile phase: A liquid: methanol (containing 2.5 vol. % acetic acid), Bliquid: water (containing 2.5vol.% acetic acid);

Gradient method: B liquid=60%→(25 minutes)→100% (20-minute retention);

Flow rate: 1.0 ml/min;

Detection wavelength: UV 254 nm; and

Injected amount: 2 $\mu$m;

Determination Method of the Most Stable Steric Coordination of the Organic Basic Compound containing One Nitrogen Atom in a Molecule The calculation is carried out while the structure optimization being carried out by AM1 method by employing a molecular orbital calculation program, WinMOPAC 3.0 Professional (MOPAC 2000 V1.3) on the basis of the AM1 method (Dewar, M. J. S. et al, J. Am. Chem. Soc., 107, 3902 (1985), which is a half-experiential molecular orbital method.

Acylation Reaction Ratio was Calculated from the Following Equation:

The reaction ratio from a hydroxyl group of p-hydroxybenzoic acid as aromatic hydroxycarboxylic acid to an acyl group=(p-acetoxybenzoic acid [mol %]/(p-acetoxybenzoic acid content [mol %]+p-hydroxybenzoic acid content [mol %])

Example 1

Into a reaction vessel equipped with a stirrer, a torque meter, a nitrogen gas introducing pipe, a thermometer, and a refluxing type cooling apparatus, p-hydroxybenzoic acid 911. 5 g (6.6 mol), 4,4'-dihydroxybiphenyl 409.7 g (2.2 mol), terephthalic acid 274.1 g (1.65 mol), isophthalic acid 91.4 g (0.55 mol), acetic anhydride 1,235 g (12.1 mol), and γ-picoline 0.169 g were introduced. After the inside of the reaction vessel was sufficiently replaced with nitrogen gas, the temperature was increased to 150° C. for 15 minutes under nitrogen gas flow, and the contents were refluxed for 30 minutes with maintaining the temperature. The result of acylation reaction ratio of 4-hydroxybenzoic acid in the obtained reaction mass by LC analysis is shown in Table 1. After that, while acetic acid, a byproduct, and unreacted acetic anhydride were removed by distillation, the obtained reaction mass was heated to 320° C. in 2 hours and 50 minutes and at the time when the torque was found increasing, the reaction was considered to finish and the produced contents were taken out. The obtained solid matter was cooled to a room temperature, crushed by a coarse crusher, under nitrogen atmosphere, heated from the room temperature to 250° C. in 1 hour and to 274° C. from 250° C. in 5 hours, and kept at 274° C. for 3 hours to carry out solid-phase polymerization reaction. When the liquid crystallinity of the obtained resin was observed by a polarization microscope, the product was found to be a liquid-crystalline polyester forming melt phase having the optical anisotropy.

Examples 2 to 5 and Comparative Examples 1 to 6

The reaction was carried out in the same manner as Example 1, except that the kinds and the addition amounts of the respective organic basic compounds were changed as shown in Table 1 to obtain the reaction mass and the acylation reaction ratios were calculated. The results are shown in Table 1 and Table 2. When the liquid crystallinity of the obtained resins was observed by a polarization microscope, similarly to Example 1, the products were found to be liquid-crystalline polyester forming melt phase having the optical anisotropy.

TABLE 1

| | | Example 1 | Example 2 | Example 3 | Example 4 | Example 5 |
|---|---|---|---|---|---|---|
| PHBA | (mol) | 6.6 | 6.6 | 6.6 | 6.6 | 6.6 |
| DHB | (mol) | 2.2 | 2.2 | 2.2 | 2.2 | 2.2 |
| TP | (mol) | 1.65 | 1.65 | 1.65 | 1.65 | 1.65 |
| IP | (mol) | 0.55 | 0.55 | 0.55 | 0.55 | 0.55 |
| acetic anhydride | (mol) | 12.1 | 12.1 | 12.1 | 12.1 | 12.1 |
| Organic basic compound | Name | γ-picoline | β-picoline | 3.5-lutidine | 4-methoxy-pyridine | iso-quinoline |
| | Addition amount (g) | 0.175 | 0.177 | 0.169 | 0.169 | 0.352 |
| Acylation duration | (min) | 30 | 30 | 30 | 30 | 30 |
| Parameter value | A + 0.4B | 0.018 | 0.01 | 0.02 | 0.03 | 0.028 |
| Acylation reaction ratio | (%) | 97.5 | 97.2 | 97.8 | 97.6 | 98.6 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| PHBA | (mol) | 6.6 | 6.6 | 6.6 | 6.6 | 6.6 | 6.6 |
| DHB | (mol) | 2.2 | 2.2 | 2.2 | 2.2 | 2.2 | 2.2 |
| TP | (mol) | 1.65 | 1.65 | 1.65 | 1.65 | 1.65 | 1.65 |
| IP | (mol) | 0.55 | 0.55 | 0.55 | 0.55 | 0.55 | 0.55 |
| acetic anhydride | (mol) | 12.1 | 12.1 | 12.1 | 12.1 | 12.1 | 12.1 |
| Organic basic compound | Name | nothing | pyridine | α-picoline | triethylamine | tributylamine | quinoline |
| | Addition amount (g) | — | 0.172 | 0.169 | 0.18 | 0.167 | 0.17 |
| Acylation duration | (min) | 30 | 30 | 30 | 30 | 30 | 30 |
| Parameter value | A + 0.4B | — | 0 | −0.01 | −0.047 | −0.045 | −0.014 |
| Acylation reaction ratio | (%) | 91.3 | 95.6 | 94.1 | 94.4 | 93.7 | 93.5 |

The abbreviations in Table 1 and Table 2 are as follows:
PHBA: p-hydroxybenzoic acid,
DHB: 4,4'-dihydroxybiphenyl,
TP: terephthalic acid, and
IP: isophtahlic acid.

What is claimed is:
1. A liquid-crystalline polyester production method comprising one of the following steps (A) to (C):
   (A) acylation reaction of the phenolic hydroxyl group of an aromatic hydroxycarboxylic acid by using a fatty acid anhydride to obtain acylated aromatic hydroxycarboxylic acid, and successively ester-exchange reaction by reacting the acylated aromatic hydroxycarboxylic acid with each other;
   (B) acylation reaction of the phenolic hydroxyl group of an aromatic diol by using a fatty acid anhydride to obtain acylated aromatic diol, and successively ester- exchange reaction by reacting the acylated aromatic diol with an aromatic dicarboxylic acid; and (C) acylation reaction of the phenolic hydroxyl group of an aromatic diol and an aromatic hydroxycarboxylic acid by using a fatty acid anhydride to obtain acylated aromatic diol and acylated aromatic hydroxycarboxylic acid, and successively ester-exchange reaction by reacting the acylated aromatic diol and acylated aromatic hydroxycarboxylic acid with an aromatic dicarboxylic acid;

wherein the acylation reaction and/or ester-exchange reaction is carried out in the presence of an organic basic compound containing one nitrogen atom and satisfying the following inequality (1):

$$0 < A + 0.4 \times B \qquad (1)$$

wherein, A and B satisfy $$A = \{(Ec^{h+} - Ec)/(Ep^{h+} - Ep)\} - 1 \text{ and}$$

$$B = (\phi f/\phi fp) - 1;$$

Ec denotes the heat of formation of the organic basic compound containing one nitrogen atom in a molecule; $Ec^{h+}$ denotes the heat of formation of a compound which is the organic basic compound coordinated by proton ($H^+$) to the nitrogen atom; Ep denotes the heat of formation of pyridine; and $Ep^{h+}$ denotes the heat of formation of a compound which is a pyridine coordinated by proton ($H^+$) to the nitrogen atom to pyridine; $\phi f$ denotes the value calculated by dividing the entire surface area by $(L+a)^2$, wherein the surface area is the portion shed over by light from a point light source without being obstructed by atoms in the molecule other than the nitrogen atom, in the spherical inner part with a radius (L+a) from the origin, which is the center of nitrogen atom of the organic basic compound containing one nitrogen atom in a molecule in the most stable steric coordination, assuming that the point light source is positioned at the origin,; L denotes the distance from the origin to the center of the atom remotest in the molecule; and "a" denotes the van der Waals radius of the atom in the molecule; and $\phi fp$ denotes the value of $\phi f$ in the case the organic basic compound containing one nitrogen atom in a molecule is pyridine.

2. The liquid-crystalline polyester production method according to claim 1, wherein the organic basic compound is at least one compound selected from the group consisting of a heterocyclic compound containing one nitrogen atom in a molecule and a heterocyclic compound containing one oxygen atom in addition to one nitrogen atom in a molecule.

3. The liquid-crystalline polyester production method according to claim 2, wherein the heterocyclic compound is represented by the following formula (2):

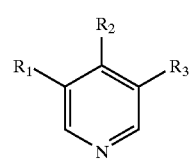

wherein, $R_1$ to $R_3$ independently denote a hydrogen atom, an alkyl group having 1 to 20 carbon atoms, an alkyloxy group having 1 to 20 carbon atoms, an aryl group having 6 to 20 carbon atoms, a cycloalkyl group having 5 to 20 carbon atoms, or an aralkyl group having 7 to 20 carbon atoms; $R_1$ with $R_2$ and/or $R_2$ with $R_3$ may be bonded with each other to form an aliphatic ring or aromatic ring; and all of $R_1$, $R_2$, and $R_3$ are not hydrogen atoms.

4. The liquid-crystalline polyester production method according to claim 1, wherein the aromatic hydroxycarboxylic acid is at least one compound selected from the group consisting of 4-hydroxybenzoic acid and 2-hydroxy-6-naphthoic acid, the aromatic dicarboxylic acid is at least one compound selected from a group consisting of terephthalic acid and isophthalic acid, and the aromatic diol is 4,4'-dihydroxybiphenyl.

* * * * *